Figure 1:
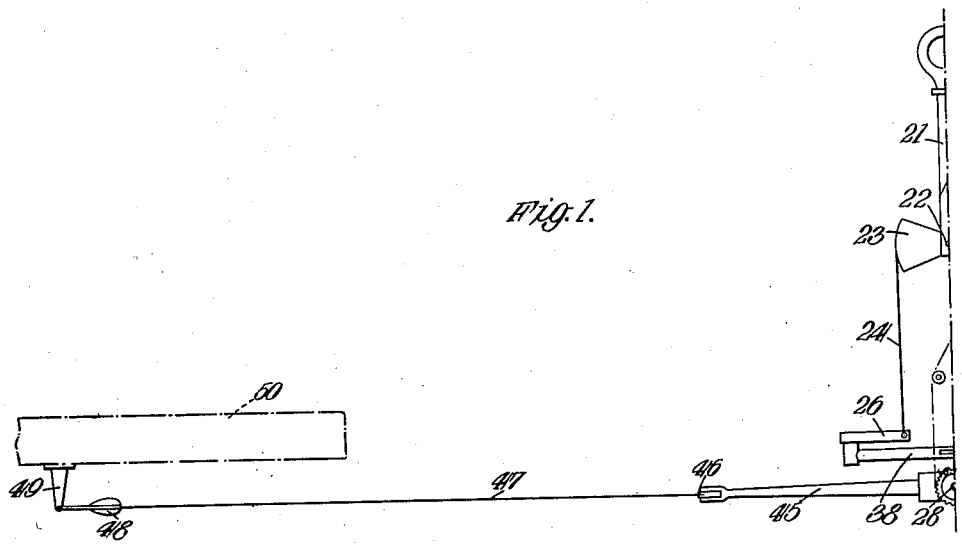

Aug. 26, 1930.                M. LOBELLE                1,774,024
CONTROLLING DEVICE FOR AEROPLANES AND SIMILAR AIRCRAFT
            Filed Oct. 16, 1928      8 Sheets-Sheet 1

Inventor:
Marcel Lobelle,
Atty.

Inventor:
Marcel Lobelle,

Att'y.

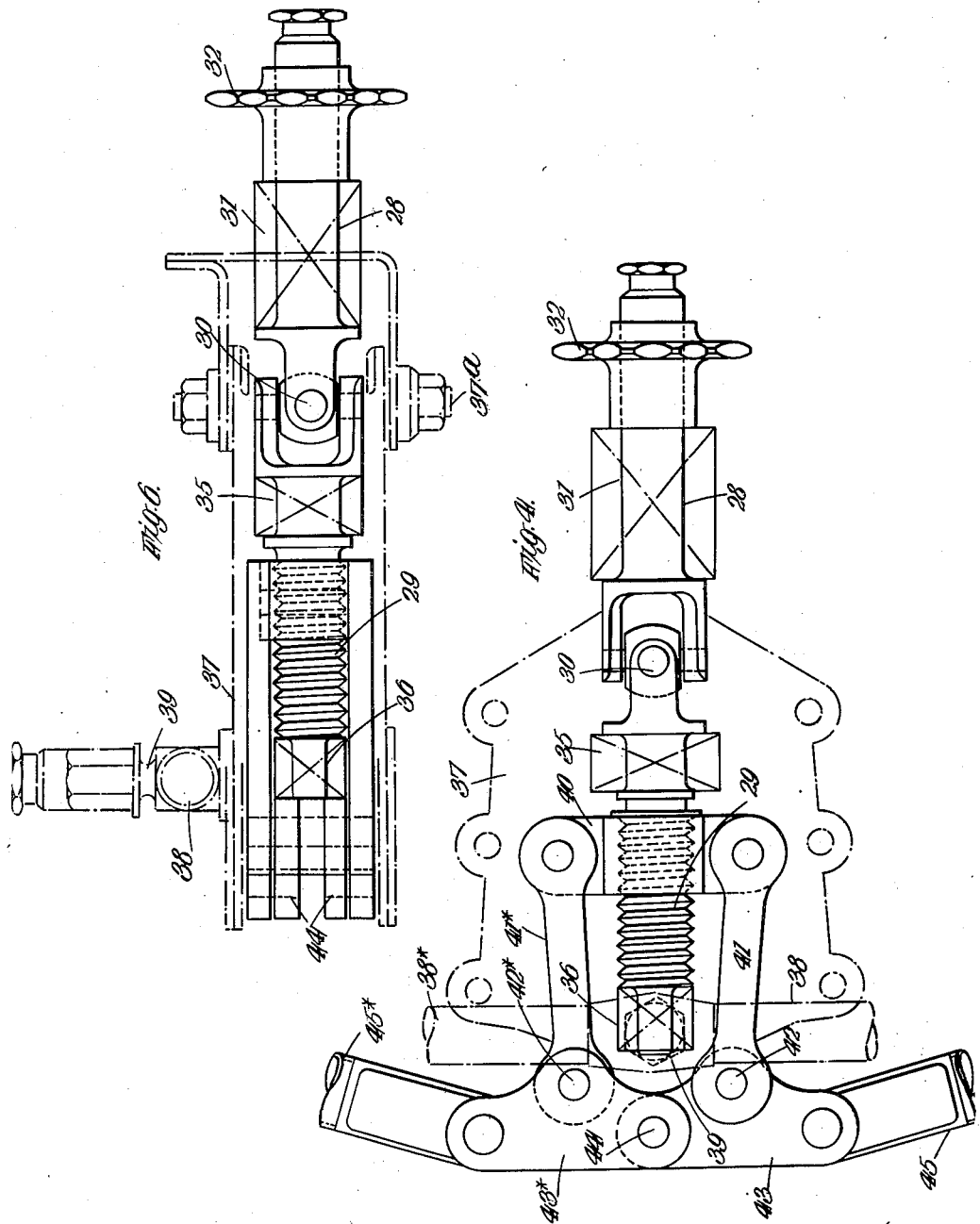

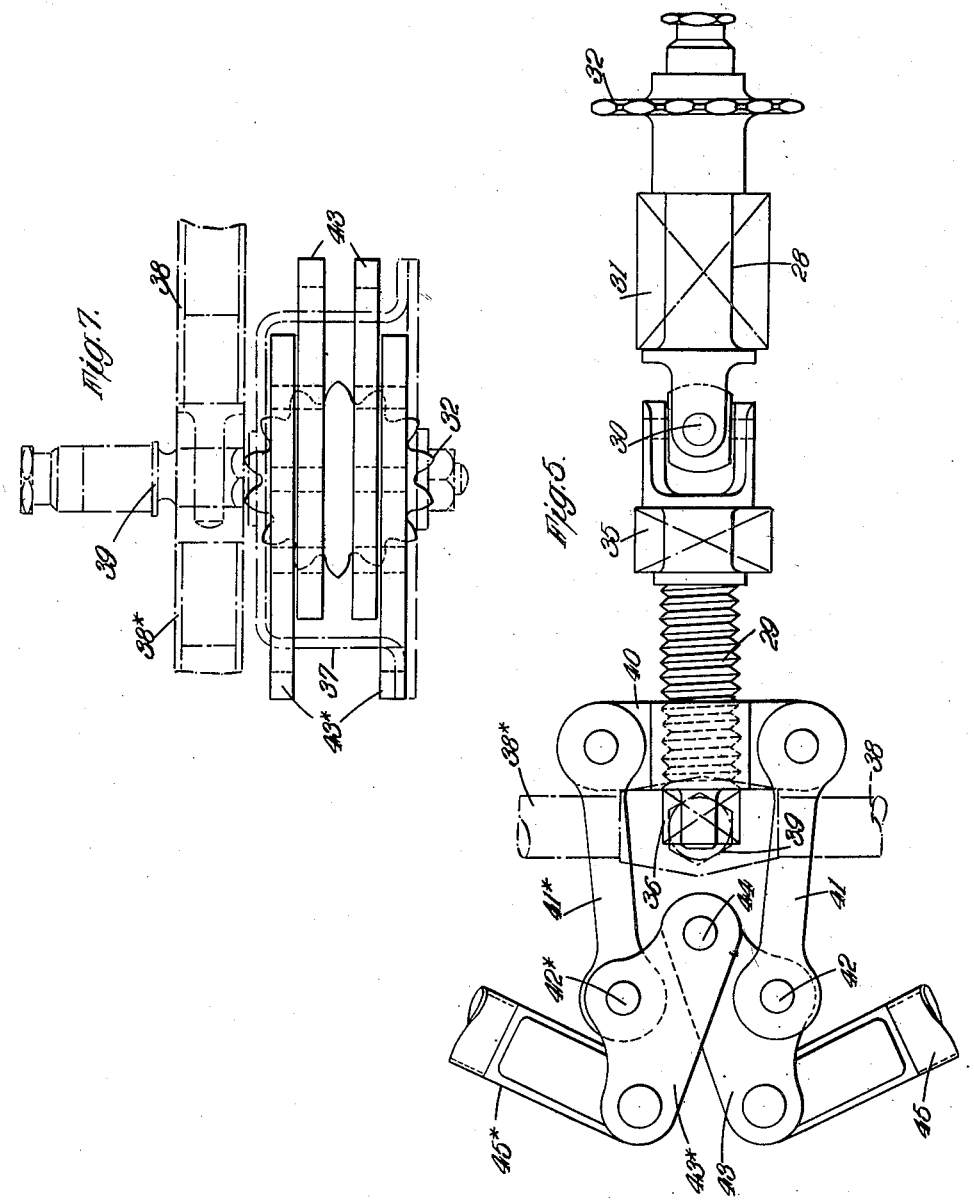

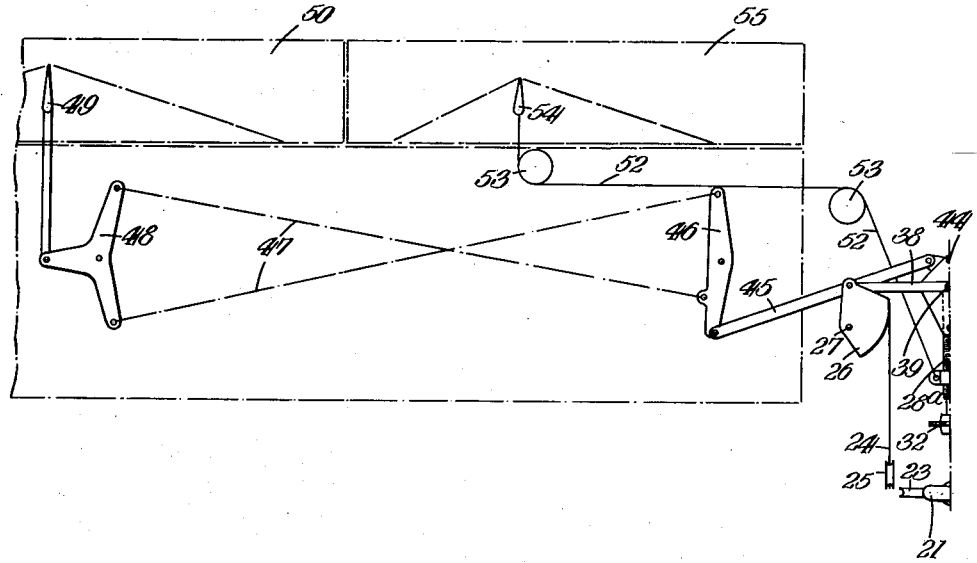
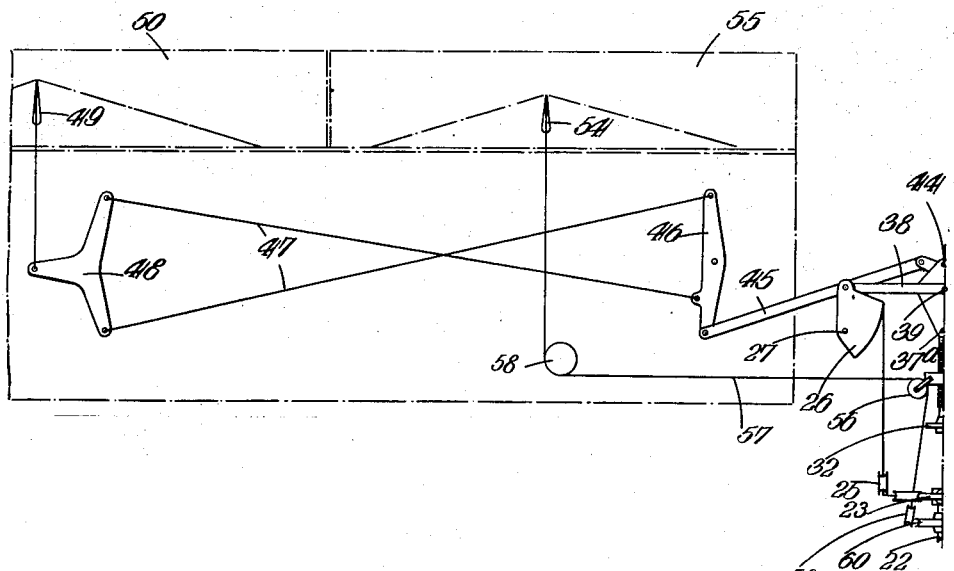

Aug. 26, 1930.   M. LOBELLE   1,774,024
CONTROLLING DEVICE FOR AEROPLANES AND SIMILAR AIRCRAFT
Filed Oct. 16, 1928   8 Sheets-Sheet 6
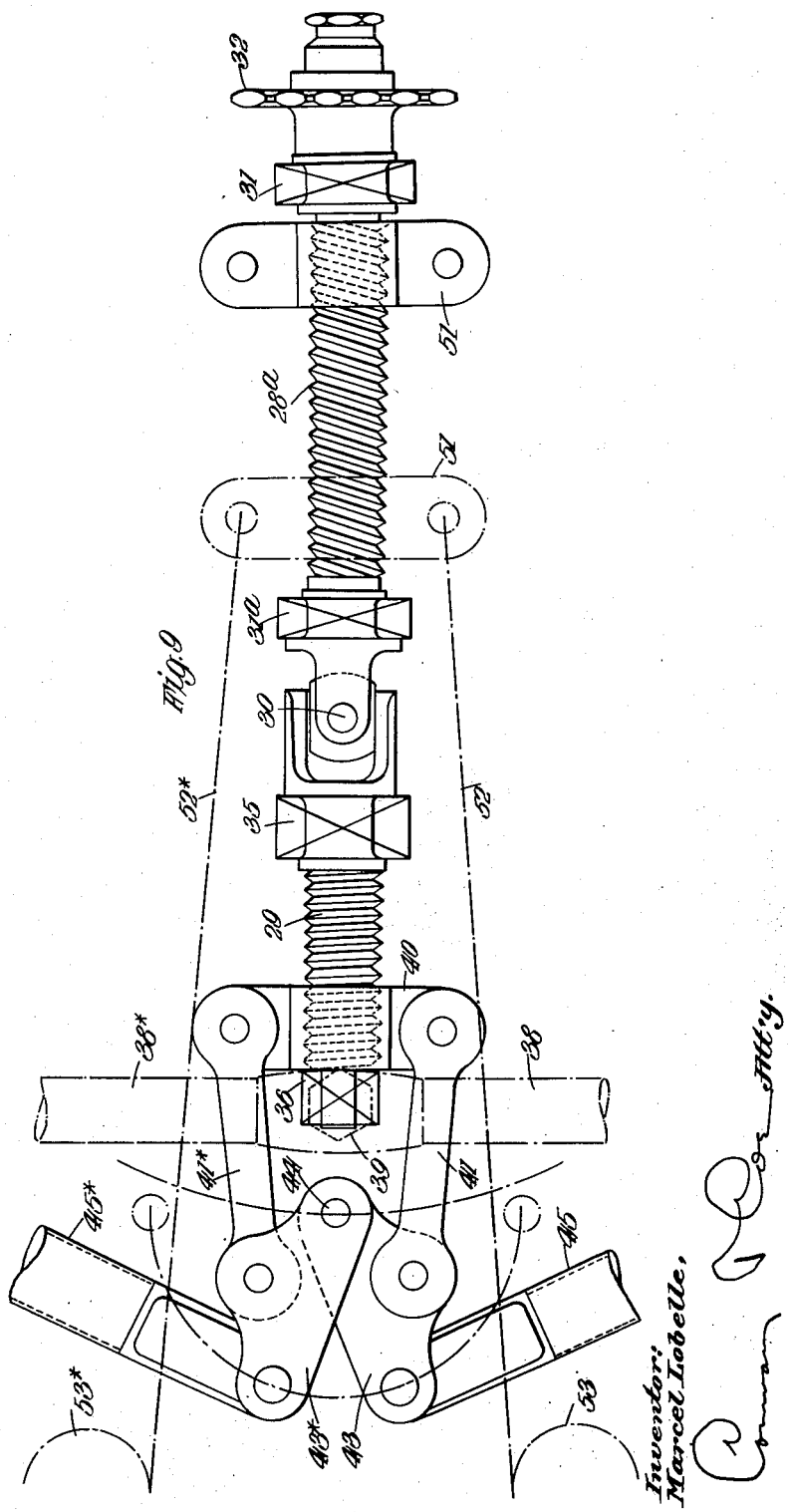
Inventor:
Marcel Lobelle.

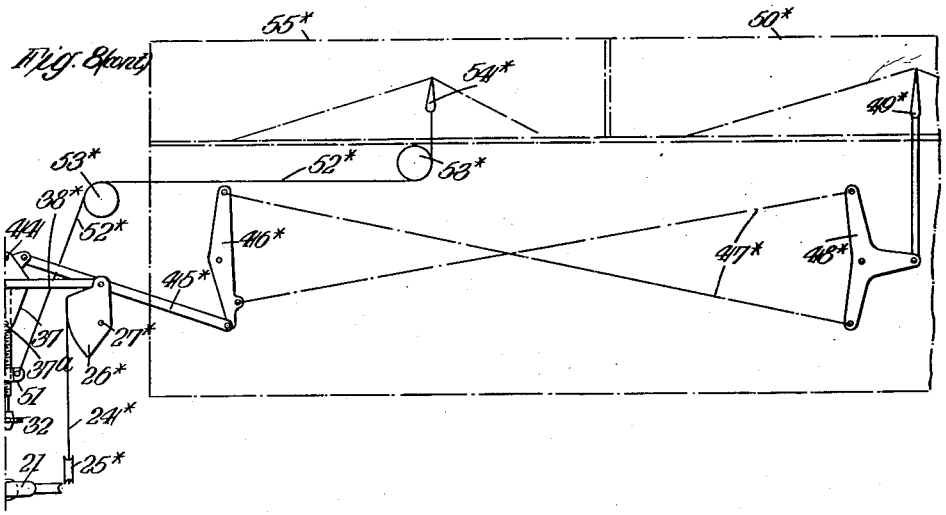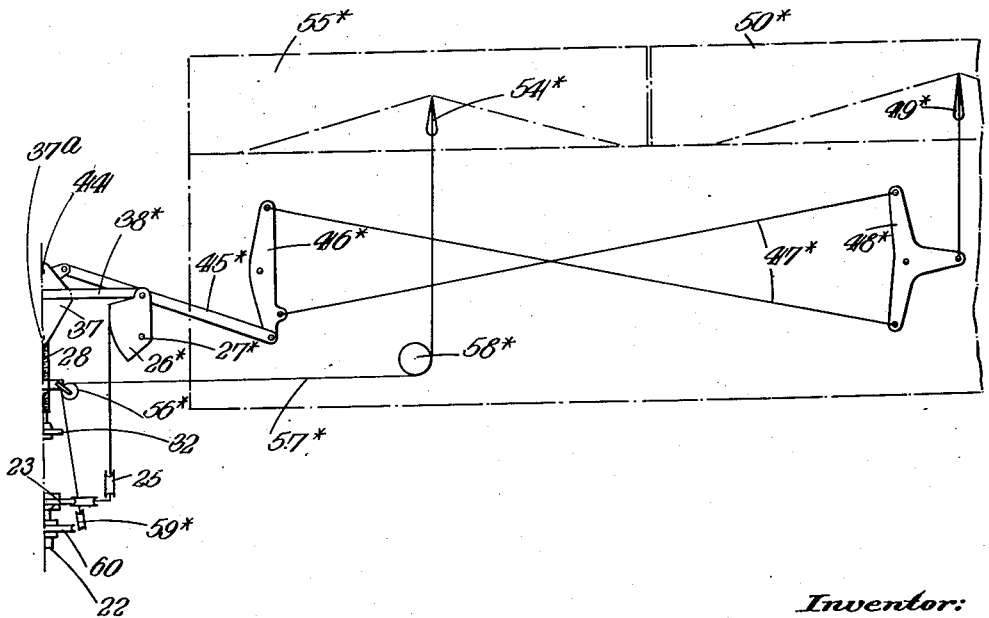

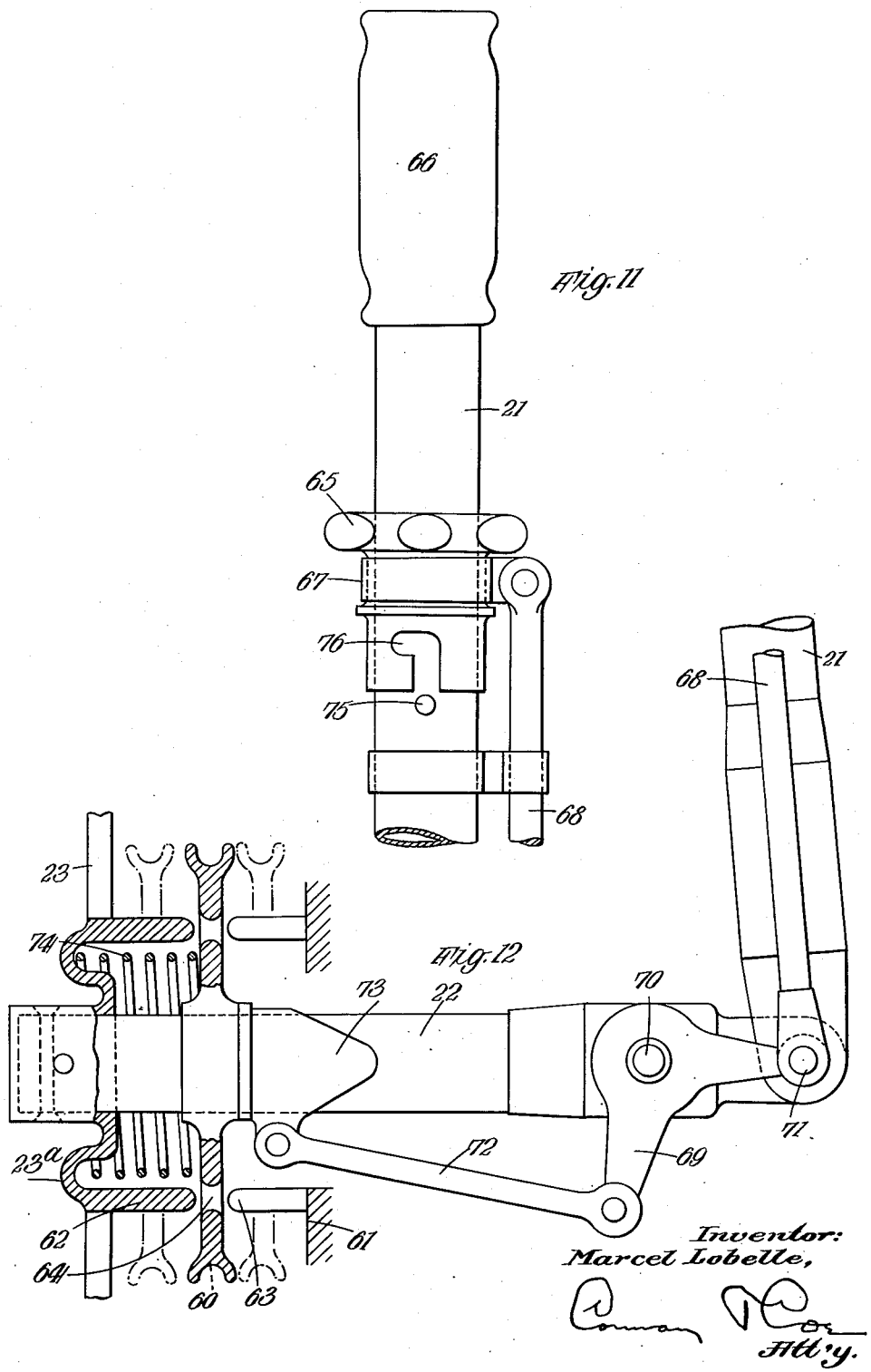

Patented Aug. 26, 1930

1,774,024

UNITED STATES PATENT OFFICE

MARCEL LOBELLE, OF HAYES, ENGLAND, ASSIGNOR TO CHARLES RICHARD FAIREY, OF HAYES, ENGLAND

CONTROLLING DEVICE FOR AEROPLANES AND SIMILAR AIRCRAFT

Application filed October 16, 1928, Serial No. 312,839, and in Great Britain October 27, 1927.

This invention relates to aeroplanes and similar aircraft of the kind wherein each wing of a pair has a trailing marginal portion constituting a flight-controlling element and adapted to be flexed in either direction alternatively for flight-controlling purposes, such flexible portion either being single in each wing of the pair, in which case it is hereinafter referred to as an "aileron", or being divided into two (or more) sections respectively distal and proximal, in which case the distal section is hereinafter termed an "aileron" whilst the proximal section is termed a "flap". It is already known to provide means for effecting various control movements of these flexible trailing marginal portions or flight-controlling elements of a pair of wings, in particular the following, viz:—

A. In cases where each wing of a pair has only a single aileron, it is known to provide for means effecting:—

1. Simultaneous movement of the respective ailerons in opposite directions, for the purpose of controlling lateral stability;

2. Simultaneous movement of both ailerons in the same direction, for the purpose of varying the camber of both wings concurrently; it being understood that, whilst either of these movements A1 or A2 may be performed alone and independently of the other, both may be performed concurrently without mutual interference, within the permissible limits of total flexure.

B. In cases where each wing of a pair has both an aileron and a flap, it is known to provide means for effecting:—

1. Simultaneous movement of the respective ailerons alone in opposite directions, for the purpose of controlling lateral stability;

2. Simultaneous movement of both ailerons and both flaps in the same direction, for the purpose of varying the camber of both wings concurrently; it being understood that, whilst either of these movements B1 or B2 may be performed alone and independently of the other, both may be performed concurrently without mutual interference, within the permissible limits of total flexure.

C. In other cases where each wing of a pair has both an aileron and a flap, it is known to provide means for effecting:—

1. Simultaneous movement of the respective ailerons alone in opposite directions, for the purpose of controlling lateral stability;

2. Simultaneous movement of the respective flaps alone in opposite directions, for the purpose of controlling lateral stability;

3. Simultaneous movement of the respective ailerons, together with the respectively corresponding flaps, in opposite directions, for the purpose of controlling lateral stability;

4. Simultaneous movement of both ailerons alone in the same direction, for the purpose of varying the camber of both wings concurrently;

5. Simultaneous movement of both flaps alone in the same direction, for the purpose of varying the camber of both wings concurrently;

6. Simultaneous movement of both ailerons and both flaps in the same direction, for the purpose of varying the camber of both wings concurrently; it being understood that, whilst any one of these movements C1....C6 may be performed alone and independently of any other, any two or more of said movements may be performed concurrently without mutual interference, within the permissible limits of total flexure.

The present invention is directed to provide improved means for effecting, according to requirements, any or all of the control movements mentioned above, and in particular those groups of movements set forth under the headings A1, A2; B1, B2; and C1, C3, C6, respectively.

For the purpose of the invention, those movements which are required for effecting lateral control are derived from angular displacements, in opposite directions alternatively, imparted to a "main" rotatable member by the usual flying control-lever (or equivalent manual device), said main rotatable member being operatively connected with the appropriate flight-controlling elements of the respective wings so that, according as the control-lever is actuated in the one or the other direction, the flight-controlling element or elements of the one wing will be raised and that or those of the other wing will be depressed, or vice versa. On the other hand, those movements which are required for effecting variations of camber of both wings concurrently are derived from the rotation, in opposite directions alternatively, manually imparted to a screw-shaft carrying a nut or nuts operatively connected with, or otherwise adapted to influence, the appropriate flight-controlling elements of both wings so that, according as the screw-shaft is rotated in the one or the other direction, said flight-controlling elements will both together be flexed in the one or the other direction.

According to the present invention a screw-shaft, formed in two sections whereof one is journalled in stationary bearings and provided with means whereby it may be manually rotated in either direction alternatively, has its other section which is coupled to the first by a universal joint, threaded to carry a travelling nut coupled by a pair of reversely-disposed toggle-mechanisms to a pair of oppositely-extending links serving to control the flexure of the respective ailerons; whilst an oscillatory member, carrying bearings for the threaded section of the screw-shaft and also for the central common pivotal axis of the pair of toggle mechanisms, is so pivoted, about a stationary axis which passes through the point of intersection of the two pivotal axes of the universal joint, as to be angularly movable in a plane parallel to that wherein both the toggle mechanisms work; said oscillatory member being coupled, by a pair of links which also extend in opposite directions in a plane parallel to said toggle-plane, to a pair of reversely-disposed bell-crank levers which are connected, as by a pair of cables or equivalent connections, to points on opposite sides of the axis of the main rotatable member previously referred to.

In consequence of the arrangement just described, on the one hand angular movement in either direction imparted to the main rotatable member by the control-lever is transmitted to the bell-crank levers, which, moving in opposite directions respectively, cause the oscillatory member to swing towards the one or the other side as the case may be, such swinging movement of the oscillatory member being participated in bodily by both toggle-mechanisms and by the aileron-controlling links attached thereto, with the result that the one aileron is depressed and the other simultaneously raised, or vice versa, to effect lateral control of the aircraft in flight, but without otherwise affecting the toggle-mechanisms themselves as such. On the other hand, rotation in either direction manually imparted to the screw-shaft will cause the nut to travel in the one direction or the other as the case may be, and will consequently actuate both toggle-mechanisms in the one or the other sense, with the result that both aileron-controlling links will transmit either a thrust or a tractive effort (or vice versa) so as to cause both ailerons to be either depressed or raised to vary the camber of both wings concurrently in accordance with the direction in which the screw-shaft is rotated. Moreover, owing to the interposition of the universal joint between the two sections of the screw-shaft, this action whereby the camber of both wings is varied can take place whatever may be the inclination of the nut-carrying section of the screw-shaft relatively to that other section which is journalled in stationary bearings. Hence, the two distinct operations of controlling lateral stability and of varying the camber of the wings can be performed either concurrently with or independently of one another at will, any movement imparted to either aileron for the one purpose being superimposed upon any movement imparted to the same aileron for the other purpose, of course within the permissible limits of total flexure.

The above described provisions, as will be perceived suffice for the production of the control movements already set forth under the headings A1 and A2, in cases where each wing of a pair has only a single aileron. In cases, however, where, as set forth under the headings B1 and B2, each wing of a pair has both an aileron towards the tip of the wing and also a flap between the aileron and the body of the machine, and it is required to provide means not only for imparting simultaneous movement to the respective ailerons alone in opposite directions for the purpose of controlling lateral stability, but also, when necessary, for imparting simultaneous movement to both ailerons and both flaps in the same direction for the purpose of varying the camber of both wings concurrently; the following additional provision is made. That is to say, both sections of the screw-shaft are threaded, that section which is journalled in stationary bearings carrying a travelling nut which is connected by direct or positive means (as by a pair of oppositely-extending cables or equivalent elements) to the respective flaps so that, on the screw-shaft being rotated to cause both ailerons to be depressed or raised, said direct or positive means will be actuated in the corresponding sense with the result that both flaps will also be depressed or raised. With this arrangement, the flaps participate in the movement of the ailerons only when the latter are both moved simultaneously in the same direction, no other movement of the flaps being provided for.

In cases, however, where, as set forth under the headings C1, C3, and C6 above, it is required not only to provide means for imparting simultaneous movement to the respective ailerons alone in opposite directions for the purpose of controlling lateral stability, but also, when desired, for reinforcing such lateral control by concurrently imparting simultaneous movement to the respective flaps in opposite directions, as well as for imparting, when necessary, simultaneous movement to both ailerons and both flaps in the same direction for the purpose of varying the camber of both wings concurrently, a still further additional provision is made, as follows. That is to say, the travelling nut which engages that section of the screw-shaft which is journalled in stationary bearings is not connected to the respective flaps by direct or positive means as before, but carries a pair of guide-pulleys around which are respectively led a pair of oppositely-extending cables attached by their one ends to the respective flaps and by their other ends to points on opposite sides of the axis of a "secondary" rotatable member mounted concentrically with the "main" rotatable member already referred to, whilst means are provided whereby this secondary rotatable member is normally held locked in a mid or neutral angular position but can at will be unlocked therefrom and locked to the main rotatable member so as to participate in any angular movements imparted to the latter by the control-lever. With this arrangement, movement of the control-lever in either direction will, normally, depress the one aileron alone and raise the other aileron alone, corresponding movements being imparted to the respective flaps only when the second rotatable member is unlocked from its neutral angular position and locked to the main rotatable member. On the other hand, rotation of the screw-shaft will cause not only both ailerons, but also both flaps, to be depressed or raised; the movement of that nut which carries the pair of guide-pulleys having for effect to draw upon, or relax, the cables which are led around said pulleys on their way from the secondary rotatable member to the respective flaps. Moreover, as will be perceived, the operations of controlling lateral stability, whether as set forth under the heading C1 or C3, can be performed either concurrently with or independently of the operation of varying the camber of both wings as set forth under the heading C6, and vice versa.

Suitable modifications of the arrangement last described may be made for the purpose of effecting the control movements set forth under the headings C2, C4, C5 above; but such movements are of comparatively small value and would seldom, if ever, be required in actual practice.

Figure 2:
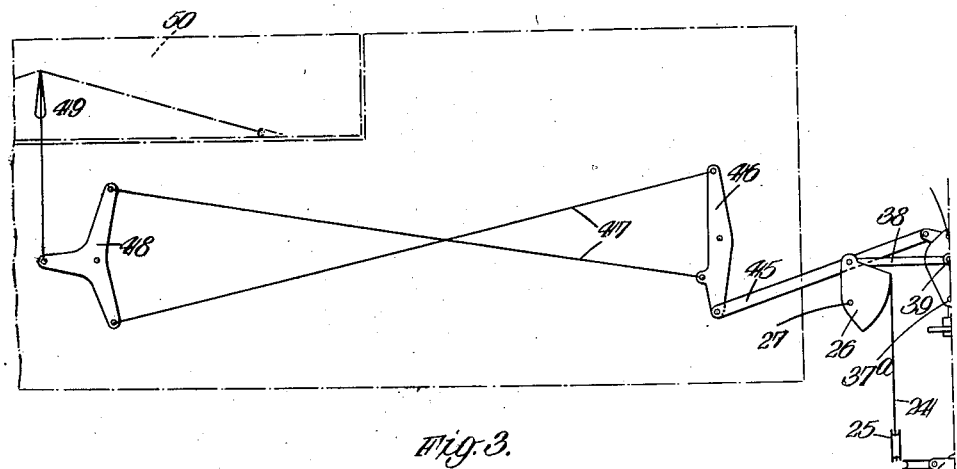
Figure 3:
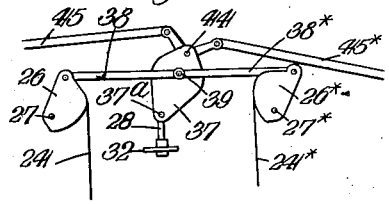
Figure 1:
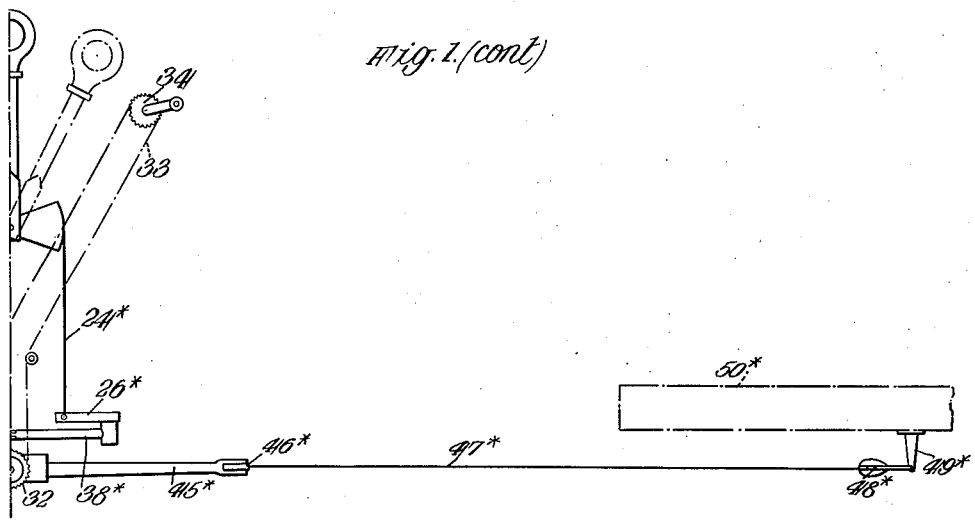
Figure 2:
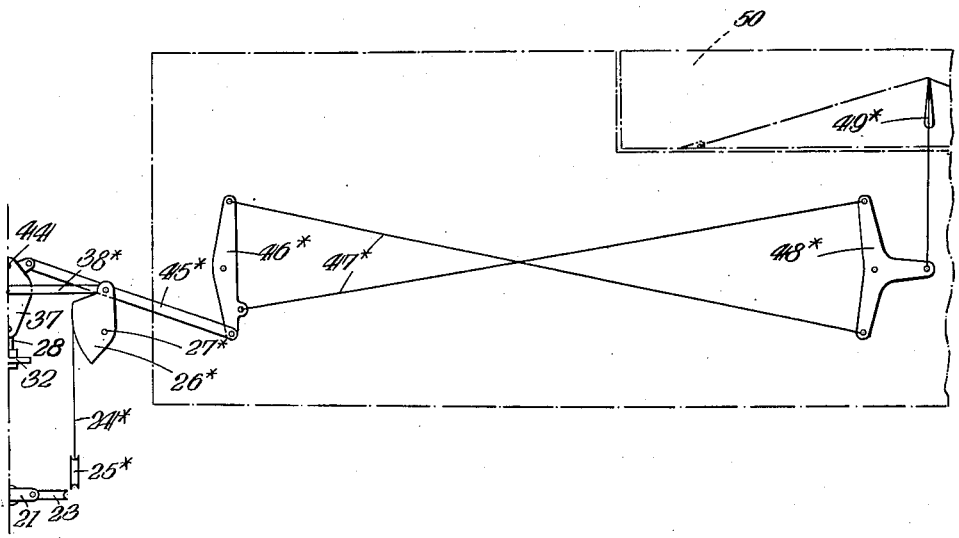

In the accompanying drawings, Figures 1 to 7 illustrate one form of the improved apparatus of the present invention as adapted for effecting the control movements set forth above under the headings A1 and A2; Figure 1 being a diagrammatic front elevation and Figure 2 a corresponding plan view of the arrangement as a whole, whilst Figure 3 is a partial plan view corresponding to the central portion of Figure 2, illustrating the effect of rocking the oscillatory frame towards one side. Figures 4, 5, 6 and 7 are detailed views, drawn to a larger scale, of the oscillatory frame, screw-shaft, and toggle mechanisms; Figures 4 and 5 being plan views showing the toggles in their two extreme positions respectively, whilst Figure 6 is a side elevation, and Figure 7 an end elevation of the same.

Figures 8 and 9 illustrate a modified form of the improved apparatus, as adapted for effecting the control movements set forth above under the headings B1 and B2; Figure 8 being a diagrammatic plan view similar to Figure 2, whilst Figure 9 is a detail plan view similar to Figure 5.

Figures 10, 11 and 12 illustrate a still further modification of the improved apparatus, as adapted for effecting the control movements set forth above under the headings C1, C3, and C6; Figure 10 being a diagrammatic plan view similar to Figures 2 and 8, whilst Figures 11 and 12 are detail views of the upper and lower portions of the main flying control-lever.

Referring, first, to the arrangement illustrated in Figures 1 to 7 (see headings A1, and A2 above), the usual manually-operable control-lever 21 is mounted upon a rock-shaft 22 extending fore-and-aft in the central vertical longitudinal plane of the machine and having fast upon it a drum or the like 23 to which, at opposite points of its periphery, are attached a pair of cables 24, 24* which are led around suitable guide-pulleys 25, 25* to a pair of similar but reversely-disposed cam-pulleys 26, 26* (constituting or representing the bell-crank levers above referred to) mounted at opposite sides of said plane to rock in a substantially horizontal plane about stationary axes 27, 27* so that movement of the control-lever 21 towards one side or the other will cause both cam-pulleys 26, 26* to turn also towards one side or the other. Midway between the cam-pulleys a screw-shaft extends fore-and-aft in the plane of their angular movement, this screw shaft being in two sections 28, 29 united by a universal joint 30 whereof the virtual centre is situated in the common plane of the axes of both cam-pulleys. The one section 28, which is journalled in a stationary bearing 31, carries a sprocket-wheel 32 whereby it can be rotated by means of a chain 33 from a manually-rotatable sprocket-wheel 34 mounted in convenient proximity to the pilot's seat, whilst the other section 29, which is threaded, is journaled in bearings 35, 36 carried by a frame 37 mounted to oscillate in a plane parallel to the plane of movement of the cam-pulleys 26, 26*; the axis 37ᵃ of oscillation of this frame 37, which is situated midway between and parallel to the axes of the cam-pulleys, intersecting the virtual centre of the universal joint 30. The cam-pulleys 26, 26* are coupled from opposite sides, by means of a pair of links 38, 38* to point 39 in the frame 37 such that the links will remain in mutual alignment for all angular displacements of the cam-pulleys and of the frame, which latter is contrained to participate in such displacements. The threaded section 29 of the screw-shaft engages a travelling nut 40, to oppositely-disposed ears on which are attached a pair of links 41, 41* which pivotally engage the middle points 42, 42* of a pair of reversely-disposed toggle-levers 43, 43* having one arm of each pivoted at a common axis 44 carried by the oscillatory frame 37 parallel to the axis 37ᵃ of oscillation of the frame and intersecting the prolongation of the axis of the threaded section 29 of the screw-shaft. The other (or outer) arm of the toggle-levers 43, 43* have pivotally attached to them a pair of divergent links 45, 45* whereof the outer ends are attached to sway-levers 46, 46* on the respective wings near the body of the machine; each of these sway-levers being connected by a pair of crossed wires 47 or 47* to a similar sway-lever 48 or 48* situated towards the outer end of the wing and suitably coupled to the usual lever 49 or 49* projecting from beneath the corresponding aileron 50 or 50*.

In the modification of the above arrangement required for effecting the control movements set forth under the headings B1 and B2 (see Figures 8 and 9), both sections of the screw-shaft are threaded (if necessary in opposite directions respectively), and that section (in this case designated as 28ᵃ) which is journaled in stationary bearings 31, 31ᵃ, carries a travelling nut 51 to which are fixed one end of a pair of divergent cables 52, 52* each of which is led around stationary guide-pulleys 53 or 53* and fixed by its outer end to the usual lever 54 or 54* projecting from beneath the corresponding flap 55 or 55*.

In the further modification required for effecting the control movements set forth under the headings C1, C3, C6 (see Figures 10, 11 and 12), both sections 28ᵃ and 29 of the screw-shaft are again threaded, but the nut 51 on that section 28ᵃ which is journalled in stationary bearings 31, 31ᵃ carries a pair of guide-pulleys 56, 56* (Figure 10) around which are led divergent cables 57, 57* each of which is led around a stationary guide pulley 58 or 58* and fixed by its outer end to the usual lever 54 or 54* projecting from beneath the corresponding flap 55 or 55*. These cables 57, 57* are led, in the other direction, around suitable stationary guide-pulleys 59, 59* to a driving-pulley 60 upon the rock-shaft 22 whereon the control-lever 21 is mounted; this driving-pulley 60 (Figure 12) being face-to-face with the aileron-actuating drum 23 but slidable to-and-fro axially, whilst the hub 23ᵃ of said drum 23 and also a stationary abutment 61 beyond the opposite face of the driving-pulley 60 are provided respectively with pins 62, 63 adapted to engage with holes 64 in the web of the driving-pulley 60 according as the latter is moved bodily towards or away from the drum 23. Such bodily axial movement of the driving-pulley is effected by lever-and-link mechanism (see Figures 11 and 12) from a manually-controllable collar 65 slidable upon and partly rotatable about the control-lever 21 close to the handle-end 66 of the latter, the collar 65 being embraced by a non-rotatable slip-ring 67 which is coupled by a rod 68 to one arm of a bell-crank lever 69 fulcrumed at 70 to the rock-shaft 22 to which the control-lever is hinged at 71 for fore-and-aft movement only; whilst the other arm of the bell-crank lever 69 is coupled by a rod 72 to a slip-ring 73 splined upon the rock-shaft 22 and adapted to exert a thrust in one direction against the hub of the driving-pulley to 60 (which is splined on the shaft 22), in opposition to a spring 74 coiled in compression about the shaft 22 between said hub and the hub 23ᵃ of the drum 23 about which the aileron-control cables 24, 24* are lapped. It will be seen that the flaps 55, 55* are connected to the ailerons 50, 50* for conjoint control when the collar 65 and slip-ring 67 are depressed to their lowest position on the control-lever 21, in which position they can be temporarily locked by turning the collar 65 about the control-lever so as to cause a pin 75 on the lever to engage in a bayonet slot 76 in the collar; whereas, on the collar 65 being turned back to its normal angular position about the control-lever 21, it is returned to the normal position shewn, by the action of the spring 74 which simultaneously brings about disconnection of the flaps from the ailerons. The arrangement is such that, when the driving-pulley 60 is locked to the stationary abutment 61 (which can occur only when the driving-pulley is in its mid or neutral angular position), sideways movement of the control-lever 21 for the purpose of flexing the respective ailerons 50, 50* alone in opposite directions will not affect the angular position of the driving-pulley and will therefore leave both flaps 55, 55* in their normal position; whereas, when the driving-pulley 60 is locked to the aileron-controlling drum 23, sideways movement of the control-lever 21 will rock not only the drum 23, but also the pulley 60, about their common axis, and will cause the respective flaps 55, 55* to participate in the movements imparted to the corresponding ailerons 50, 50*.

The cam-pulleys 26, 26* which constitute or represent the bell-crank levers previously mentioned may be of varying radius, as may also be the opposite sides of the aileron-controlling drum 23 and of the flap-controlling driving pully 60, so as to enable any desirable increase or diminution of leverage to be obtained for a given movement of the control-lever 21.

It is to be observed that, as the outer arms of the toggle-levers 43, 43* receive, preferably, a movement of mutual separation in the operation of increasing the camber of both wings, the leverage consequently obtainable for the purpose of flexing the respective ailerons 50, 50* in opposite directions is considerably increased, when the camber is at its maximum, for any given movement of the control-lever 21.

Throughout the above description it is assumed that depression of the ailerons and flaps is effected against spring action constantly tending to raise them, but it will be obvious, in view of the state of the art, that the mechanical circuit, as between the respective ailerons or the respective flaps (as the case may require), may be completed by means of a so-called balance-wire or wires whereby depression of any aileron or flap of the one wing of a pair causes the corresponding aileron or flap of the other wing of the pair to be raised. The ailerons and/or flaps may, however, be controlled by e. g. links acting positively in both directions, thus enabling both springs and balance-wires to be dispensed with.

Where movement is imparted primarily to the respective ailerons of a pair through connections constituted by links or equivalent elements acting positively in both directions, it will be perceived that, whether the machine be provided with one or with more than one pair of wings, total crippling will not necessarily occur so long as either of the primarily-actuated ailerons with its control-connections remains intact. This is obviously of great advantage in the case of military aircraft, wherein the control-connections are liable to be shot away.

I claim:—

1. In an aeroplane wherein each wing of a pair has a trailing marginal portion adapted to be flexed in either direction during flight, means for flexing said portions, comprising a screw-shaft formed in two sections, one of said sections being journalled in stationary bearings, means for rotating said shaft manually in either direction alternatively, a universal joint coupling said sections, the second section being threaded, a travelling nut on said second section, a pair of toggle arms, a pair of oppositely-extending links connected to said toggle arms and to said nut, an oscillatory member, bearings in said oscillatory member for the threaded section of the screw-shaft and for the central common pivotal axis of the pair of toggle arms, said oscillatory member being pivoted about a stationary axis which passes through the point of intersection of the two pivotal axes of the universal joint, and being angularly movable in a plane parallel to that wherein the toggle arms work, a pair of bell crank levers, a pair of links extending in opposite directions in a plane parallel to the plane in which the toggle arms work, and coupling said oscillatory member to said bell-crank levers, a main rotatable member, and members connecting said bell crank levers to points on opposite sides of the axis of said main rotatable member, said main rotatable member being adapted to be controlled by the pilot, and means connecting said toggle arms to said marginal portions.

2. In an aeroplane as claimed in claim 1, wherein the trailing marginal portion of each wing of a pair is divided to form an aileron situated towards the tip of the wing and a flap situated between the aileron and the body of the machine, said first section of the screw-shaft being threaded, a travelling nut on said first section, oppositely extending cables connecting said nut to the respective flaps, whereby on the screw-shaft being rotated to cause both ailerons to be depressed or raised, said flaps will also be depressed or raised.

3. In an aeroplane or similar aircraft as claimed in claim 1, wherein the trailing marginal portion of each wing of a pair is divided to form an aileron situated towards the tip of the wing and a flap situated between the aileron and the body of the machine, said first section of the screw-shaft being threaded, a travelling nut on said first section, a pair of guide-pulleys on said nut, a secondary rotatable member mounted concentrically with the main rotatable member and under the control of the pilot, a pair of oppositely-extending cables attached by their one ends to the respective flaps and by their other ends to points on opposite sides of the axis of said secondary rotatable member and passing around said pulleys, means to hold said secondary rotatable member in neutral angular position, and means for locking said secondary rotatable member to the main rotatable member so as to participate in any angular movements imparted to the latter by the pilot.

MARCEL LOBELLE.